Sept. 25, 1962  H. G. ROGERS  3,055,187
REFRIGERATION AND AIR CONDITIONING APPARATUS
Filed June 30, 1959  3 Sheets-Sheet 1
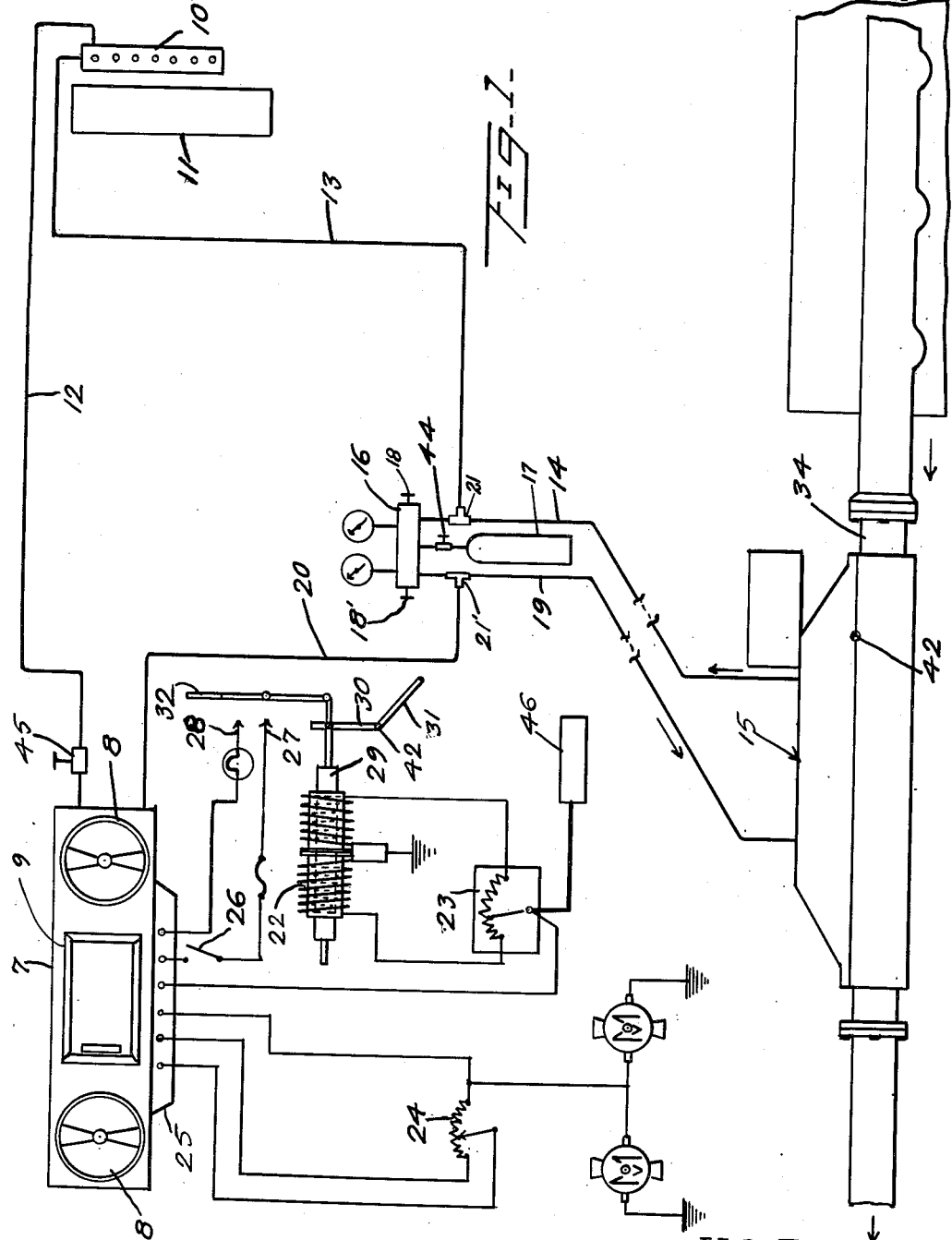
H.G.Rogers
INVENTOR
BY CASnow&Co.
ATTORNEYS.

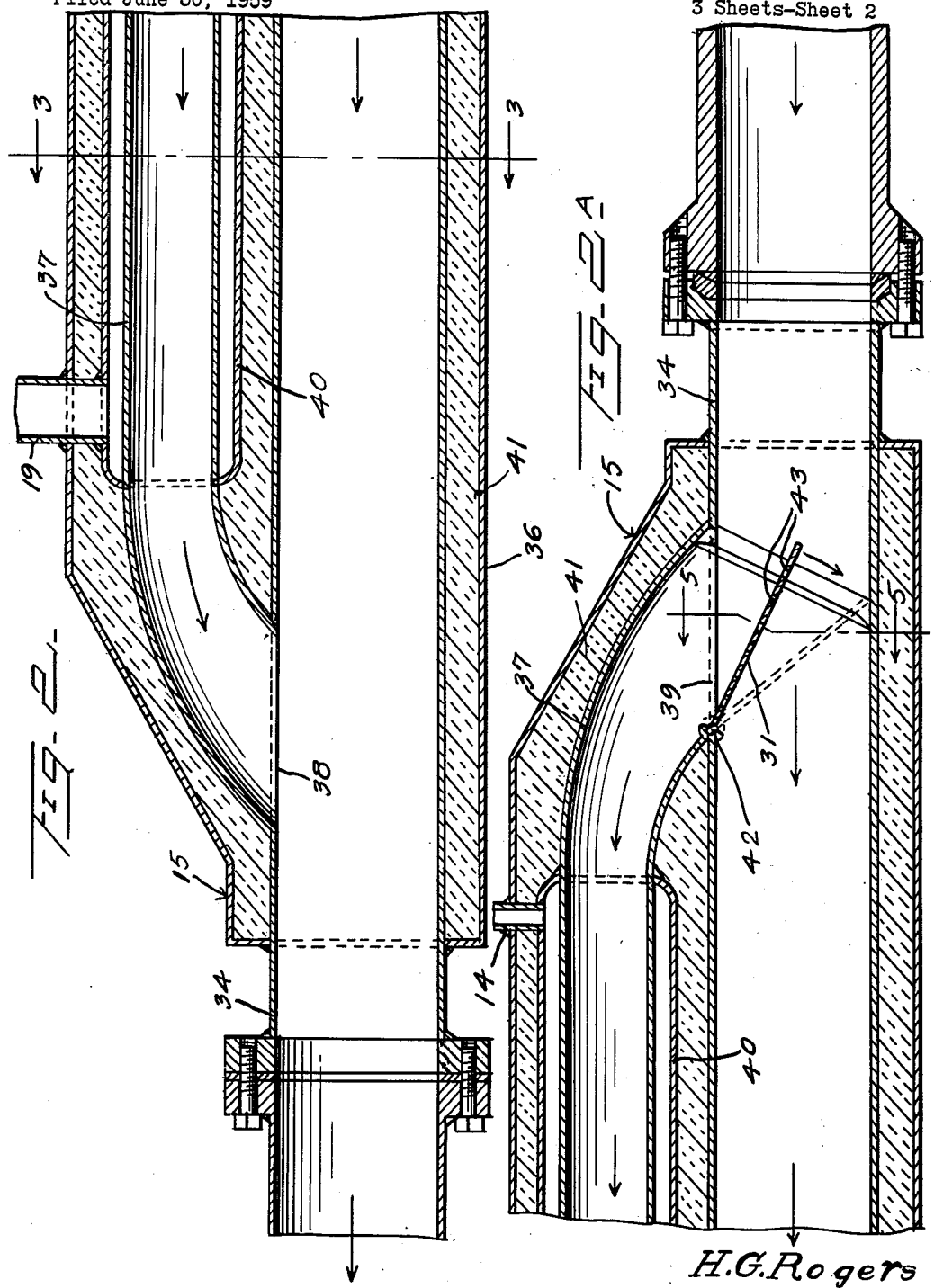

Sept. 25, 1962  H. G. ROGERS  3,055,187
REFRIGERATION AND AIR CONDITIONING APPARATUS
Filed June 30, 1959  3 Sheets-Sheet 3
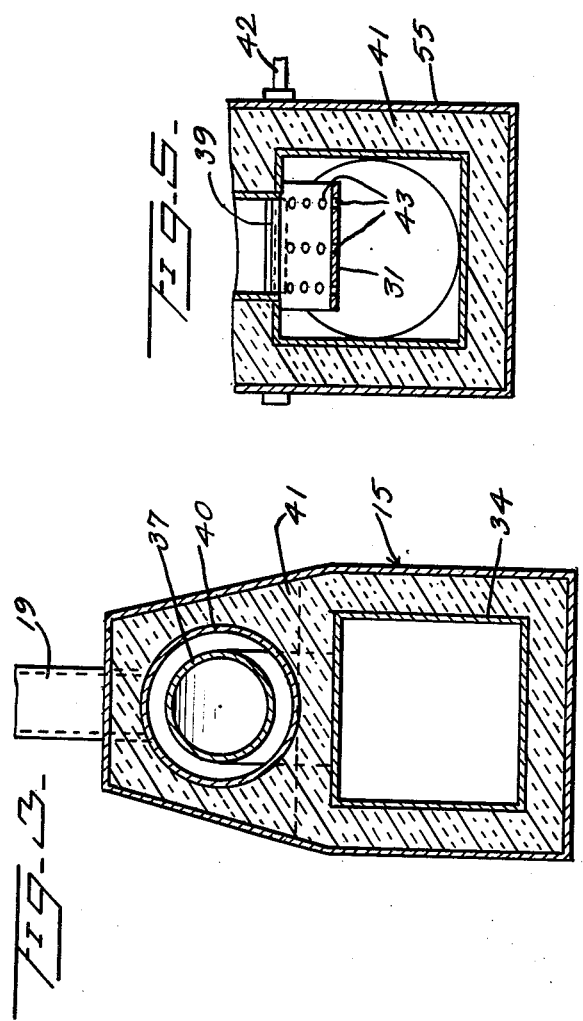
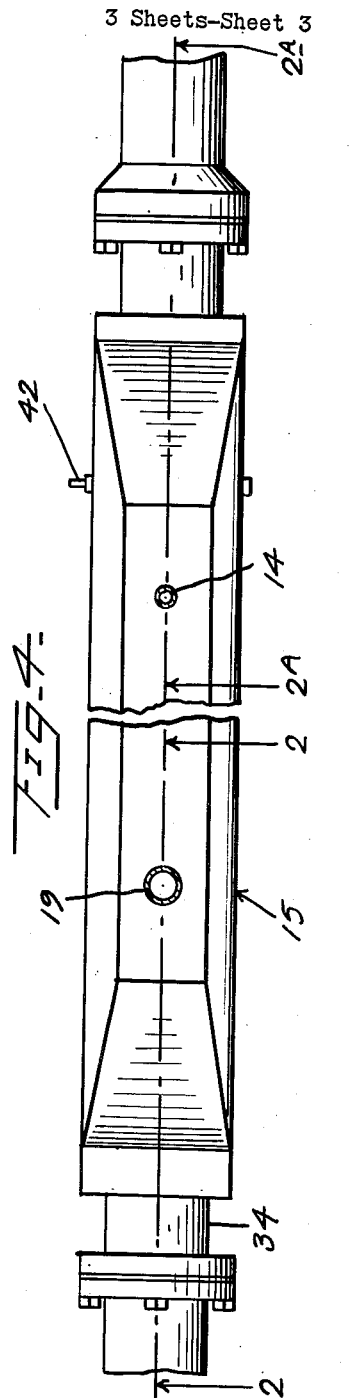
H. G. Rogers
INVENTOR
BY C. A. Snow & Co.
ATTORNEYS.

3,055,187
REFRIGERATION AND AIR CONDITIONING APPARATUS

Herbert G. Rogers, 2215 NW. 36th St., Miami, Fla.
Filed June 30, 1959, Ser. No. 823,917
5 Claims. (Cl. 62—238)

This invention relates to refrigeration and air conditioning apparatus, and more particularly to that form of apparatus installed in trucks and other motor vehicles.

It is therefore an object of this invention to provide a combined refrigeration and air conditioning apparatus that is a compact and light weight unit suitable for installation in any truck or other motor vehicle, or in boats or airplanes.

Another object of this invention is to provide a refrigeration and air conditioning apparatus that uses "Freon" gas in place of the usual ammonia gas by reason of the fact that it has more efficient cooling and refrigerating properties.

Still another object of this invention is to provide a refrigeration and air conditioning apparatus that utilizes heat from the exhaust pipe in place of the usual steam coil in the "Freon" gas generator.

Other and further objects and advantages of this invention will be hereinafter described and the novel features thereof defined in the appended claims.

Referring to the drawings.

FIGURE 1 is a diagrammatic layout of the refrigeration system and the associated electrical circuit.

FIG. 2 is a sectional view taken substantially along line 2—2 of FIG. 4 as viewed in the direction indicated by the arrows.

FIG. 2A is a sectional view taken substantially along line 2A—2A of FIG. 4 as viewed in the direction indicated by the arrows.

FIG. 3 is a sectional view taken substantially along line 3—3 of FIG. 2 as viewed in the direction indicated by the arrows.

FIG. 4 is a plan view of one detail of this invention, namely the "Freon" gas generator.

FIG. 5 is a sectional view taken substantially along line 5—5 of FIG. 2A as viewed in the direction indicated by the arrows.

Similar reference characters refer to similar parts throughout the several views of the drawings.

Having reference now to the drawings in detail, and in particular to FIG. 1, there is generally indicated by the reference character 7 an evaporator fan 8 being mounted on each side of the evaporator unit 9. A condenser 10 is located directly in front of a radiator 11 of the vehicle as shown in FIG. 1 of the appended drawings. A pipe 12 connects the evaporator 9 and the condenser 10. A pipe 13 leads from the condenser 10 to a T 21. Another inlet of the T 21 is connected by a pipe 14 to "Freon" gas generator 15; the outlet of this T is connected to a mixer 16. This mixer has inlet and outlet control valves 18 and 18', respectively, and also high pressure and compound gauges thereon. The outlet control valve 18' is connected to the inlet of a T 21'. One outlet of the T 21' is connected by a pipe 19 to the "Freon" gas generator 15; the other outlet of this T is connected by a pipe 20 to the evaporator 9.

It will of course be understood that the electric system shown in diagrammatic form in FIG. 1 is not drawn in true relationship to any of the above described mechanical members of this refrigeration and air conditioning apparatus.

The electric system is comprised of a solenoid 22, a variable rheostat 23 and a variable resistor 24, all of which are connected together by electric wires in the manner shown in FIG. 1, and which is so well known by those experienced in the art as to need no further explanation, except to say that the entire electric system is connected to a control panel 25 having a master switch 26. Electric current is obtained to operate this apparatus from any suitable source, and it enters the electric wires at connections 27 and 28.

Returning now to the solenoid 22, it will be seen that it has a plunger 29 through which a pivoted control lever 30 operates butterfly valve 31 inside of the "Freon" gas generator 15. A manually operated lever 32 is also pivoted to plunger 29. A thermostat control 46, which is of the adjustable type, is connected to variable rheostat 23. The stated "Freon" gas generator 15 comprises an elongated member 36 encompassing an exhaust pipe 34 of the vehicle. The elongated member 36 contains a tube 37 parallel to and above the exhaust pipe 34. The exhaust pipe 34 has openings 38 and 39 which permit the heat passing through the exhaust pipe to flow through the tube 37 as clearly shown in FIGS. 2 and 2A of the appended drawings. A second tube 40 encompasses tube 37, and it is in this tube that the "Freon" is supplied by means of the stated inlet pipe 19 secured to one end of this tube, while the outlet pipe 14 is secured to its other end. The entire "Freon" gas generator 15 comprised of the above stated members is packed with insulating material 41. The butterfly valve 31 is hingably mounted within this "Freon" gas generator so that it controls the flow of heat through the exhaust pipe and into opening 39. The main member of the hinge mounting is of course the shaft 42 to which is secured control lever 30 on the outside of "Freon" gas generator 15. The butterfly valve 31 contains a plurality of openings 43 which permit a certain amount of the heat to flow through the tube 37 at all times. The bypass openings 43 which permit continuous circulation of hot exhaust gases through the gas generator 15 prevent undesirable moisture from forming in the bypass cylinder 40 which could cause corrosion of this cylinder and within the remaining portions of the exhaust pipe since the liquid condensing in cylinder 40 could flow by gravity into the other portions of the exhaust pipe. It is apparent that if the valve 31 were rapidly and fully closed after continuous operation of the cooling system, that the refrigerant would tend to cool the cylinder 40 below normal atmospheric temperature thereby causing the gases therein to be cooled below the dew point thereof and causing an accumulation of water within cylinder 40. This condensation could be particularly heavy since exhaust fumes are normally highly concentrated with water vapor since water vapor is a by-product of the burning of internal combustion fuels such as gasoline and diesel oil. By having a continuous flow through the cylinder 40, the cylinder is prevented from cooling excessively and this prevents the undesirable condensation of moisture therein.

It will be understood by those experienced in the art that to operate this refrigeration and air conditioning apparatus, it is only necessary to open valve 44 on the top of the "Freon" gas cylinder 17 and close the master switch 26 in the electric circuit, and at the same time open valve 45 in pipe line 12, and assuming that the engine of the vehicle is running, the "Freon" gas will flow from its gas cylinder 17 through control valves 16 and 18' into the "Freon" gas generator 15 by means of pipes 19 and 14, where the "Freon" gas is generated by the heat of the exhaust from the engine, and the generated gas will flow upward through lines 14 and 13 into condenser 10, hence into the evaporator 7 and refrigerating unit 9 through pipe 12 and control valve 45. The amount of heat that is permitted into the "Freon" gas generator 15 is of course controlled through the electric circuit above described, by the thermostat control 46 which is connected directly to the rheostat 23, the thermostat being adjustable from 65° to 85° Fahrenheit. It should be stated that the butterfly valve 31 will permit approximately ten percent of the heat passing through the exhaust pipe to circulate through the gas chamber, even when the stated valve is closed, and of course more heat passes therethrough when the valve is open.

It is realized by those experienced in the art that the evaporator 7, fan 8 and refrigerator 9 are all mounted on a single panel located in the rear wall of the body of the vehicle and that ducts feed refrigerated air from the refrigerator to the fans hence it is circulated within the body of the vehicle while the air intake ducts are underneath the evaporator. These ducts have screened openings for taking the air off the floor of the vehicle. None of the ducts on the body of the vehicle are shown in the drawings, since they are all commercial items that do not actually form a part of this herein described invention.

From the foregoing it will be seen that there is herein provided a refrigerating and air conditioning apparatus which accomplishes all of the objects of this invention and others, including many advantages of great practical utility and commercial importance.

As many embodiments may be made of this invention concept, and as many modifications may be made in the embodiment hereinbefore shown and described, it will be understood that all matter herein is to be interpreted merely as illustrative.

What is claimed is:

1. A refrigeration device for use on vehicles including an internal combustion engine having an exhaust pipe; said device including a gas generator surrounding a portion of the exhaust pipe and heated thereby, a condenser, an evaporator, first conduit means connecting an outlet of the generator to an inlet of the condenser, second conduit means connecting an outlet of the condenser to an inlet to the evaporator, third conduit means connecting an outlet of the evaporator to an inlet of the gas generator, said gas generator including an exhaust bypass connected to the exhaust pipe and having a control valve therein for controlling the rate of flow of exhaust gases therethrough, an electric solenoid operatively connected to said valve, a rheostat connected electrically with said solenoid and a source of electricity, a thermostat operatively connected to said rheostat so as to control the current in said solenoid and the position of said valve, the temperature of said thermostat being controlled by said evaporator, said valve being perforated so as to permit some exhaust gases to flow to said generator when the valve is fully closed.

2. A device as defined in claim 1 wherein said generator includes two coaxial cylinders of different diameter, the smaller of said cylinders comprising said bypass and the space between the cylinders comprising a chamber for receiving and heating a refrigerant.

3. A device as defined in claim 2 wherein said refrigerant comprises Freon and said generator and at least a portion of said exhaust pipe are insulated from the surrounding atmosphere.

4. A device as defined in claim 3 wherein the outlet valve of a pressurized cylinder of refrigerant is connected by other conduit means to said first and third conduit means, said other conduit means including a mixing valve.

5. A refrigeration device for use on vehicles including an internal combustion engine having an exhaust pipe; said device including a gas generator surrounding a portion of the exhaust pipe and heated thereby, a condenser, an evaporator, first conduit means connecting an outlet of the generator to an inlet of the condenser, second conduit means connecting an outlet of the condenser to an inlet to the evaporator, third conduit means connecting an outlet of the evaporator to an inlet of the gas generator, said gas generator including an exhaust bypass connected to the exhaust pipe and having a control valve therein for controlling the rate of flow of exhaust gases therethrough, a thermostat controlled by the temperature of air cooled by said evaporator, means operatively connecting said thermostat to said control valve so that said thermostat may open and close said valve in response to changes in temperature of the air cooled by said evaporator, said valve being provided with bypass means so as to permit some of the exhaust gases to flow through said bypass means to said generator when the thermostat causes the valve to move to its closed position.

References Cited in the file of this patent

UNITED STATES PATENTS

| | | |
|---|---|---|
| 1,839,197 | Carney | Jan. 5, 1932 |
| 2,134,188 | Haywood | Oct. 25, 1938 |
| 2,783,622 | Bourassa | Mar. 5, 1957 |
| 2,839,274 | Polin | June 17, 1958 |
| 2,953,907 | De Cicco et al. | Sept. 27, 1960 |